United States Patent
Simon (10) Patent No.: US 7,778,161 B2
(45) Date of Patent: *Aug. 17, 2010

(54) SIGNALING SYSTEM FOR TELECOMMUNICATIONS

(75) Inventor: Thor Lancelot Simon, 116 Pinehurst Ave., Apt T-11, New York, NY (US) 10033-1755

(73) Assignee: Thor Lancelot Simon, New York, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 12/105,214

(22) Filed: Apr. 17, 2008

(65) Prior Publication Data

US 2008/0192744 A1 Aug. 14, 2008

Related U.S. Application Data

(63) Continuation of application No. 10/604,863, filed on Aug. 22, 2003, now abandoned, which is a continuation of application No. 09/857,136, filed on Sep. 10, 2001, now Pat. No. 6,678,242.

(60) Provisional application No. 60/110,398, filed on Dec. 1, 1998, provisional application No. 60/132,552, filed on May 5, 1999.

(51) Int. Cl.
*H04L 12/56* (2006.01)
*H04M 7/06* (2006.01)

(52) U.S. Cl. .................. 370/218; 370/352; 370/401; 370/522

(58) Field of Classification Search .............. None
See application file for complete search history.

(56) References Cited

U.S. PATENT DOCUMENTS

| 5,974,052 | A | * | 10/1999 | Johnson et al. ............ 370/467 |
| 6,137,792 | A | * | 10/2000 | Jonas et al. ................ 370/354 |
| 6,167,444 | A | * | 12/2000 | Boden et al. ................ 709/223 |
| 6,587,460 | B1 | * | 7/2003 | Bell et al. .................. 370/385 |
| 7,050,456 | B1 | * | 5/2006 | Sprague et al. ............. 370/467 |
| 7,113,581 | B2 | * | 9/2006 | Benedyk et al. ............. 379/219 |
| 7,136,477 | B2 | * | 11/2006 | Craig et al. ................. 379/230 |

* cited by examiner

*Primary Examiner*—Chi H Pham
*Assistant Examiner*—Soon-Dong D Hyun
(74) *Attorney, Agent, or Firm*—Oppedahl Patent Law Firm LLC (57) ABSTRACT

A pair of devices (400, 401) appear to be a Common Channel Signaling (CCS) network nodes on each end of a pointdigital data link, that is, a normal CCS signaling link (402, 403). Multiple transport methods may be used to provide a redundant and diverse path for the signaling link. These methods include the encapsulation of the CCS protocol, at one or more layers, within other network protocols. In another embodiment, the present invention implements a virtual Signal Transfer Point by means of one or more encapsulating STPs (eSTPs). A packet data network (408) using standard packet-data protocols, rather than a backplane bus or specialnetwork, connects the encapsulating STPs (405, 406), and CCS messages are dynamically routed across the internal packet data network to an appropriate eSTP for transmission to the appropriate next hop address. The entire group of eSTPs appears to be one STP to the CCS network, but on the internal packet data network each eSTP operates as an autonomous message router for CCS traffic.

14 Claims, 4 Drawing Sheets

SIGNALING SYSTEM FOR TELECOMMUNICATIONS

CROSS REFERENCE TO RELATED APPLICATIONS

This is a continuation of U.S. application Ser. No. 10/604,863, filed Aug. 22, 2003, now abandoned which is a continuation of U.S. application Ser. No. 09/857,136 filed Sep. 10, 2001, which is the National Stage Entry of appl. no. PCT/US99/26894, filed Nov. 12, 1999, and issued as U.S. Pat. No. 6,678,242 on Jan. 13, 2004, incorporated herein by reference, which claims priority from U.S. appl. No. 60/110,398, filed Dec. 1, 1998, and which claims priority from U.S. appl. no. 60/132,552, filed May 5, 1999.

BACKGROUND OF INVENTION

In modern telephone networks, the voice path between a calling party and a called party and the signalling path which is used to control call-processing (call setup, teardown, billing, etc.) are distinct. This network architecture is known as a "Common Channel Signaling" ("CCS") architecture and is common throughout the North American Public Switched Telephone Network ("PSTN") and other telephone carrier networks worldwide.

The CCS architecture enables rapid call setup and teardown as well as many advanced services (i.e. Alternate Billing Services, "800" toll-free calling, Intelligent Network services, wireless roaming, Local Number Portability). In the CCS, telephone switches are connected directly to each other by voice trunks (as in previous architectures) and are also connected by a parallel network of signaling links, which are point-to-point digital data circuits generally operating at 56 kilobits per second or 64 kilobits per second. When a telephone call is initiated, messages are sent across the signaling links to cause voice trunks to be allocated from switch to switch in the call path. Throughout the duration of the call, and at the end of the call, other messages are sent back and forth across the signaling links, independently of the voice path established between calling and called party over the separate, parallel network of voice trunks.

Generally, in the CCS architecture, voice switches ("SSP", "Service Switching Points" or "Signal Switching Points") are connected by signaling links to specialized packet switches or "Signal Transfer Points" ("STP"s) which route signaling messages among themselves and to the SSPs which may be their originating or destination points. Advanced services are provided by other nodes in the network such as "Service Control Points" ("SCP"s), databases which store call procedures and which are connected to STPs by signaling links. For example, when an "800" toll-free call is dialed, the caller's SSP sends a query message across a signaling link to an STP, which routes it across one or more further signaling links (possibly transiting other STPs) to an SCP, which responds by sending a message containing the actual telephone number to which to route the call, across the signaling network to the SSP, which then sends further signaling messages across the signaling network to other SSPs in order to set up voice trunks and connect the call. A single call routed across voice trunks may actually involve many distinct exchanges of signaling messages across the signaling links in the signaling network, though to calling and called party the existence of the signaling network is never evident at all.

Obviously, were nodes in the CCS network connected by single signaling links from point to point, a link failure might have grave consequences. With no means of transmitting or receiving the signaling messages which control voice trunks, switches could not set up or tear down calls; whether the voice trunks themselves were in or out of service, the switches could not even attempt to place calls across them, and many or most calls from switches isolated from the CCS network by signaling link failure would simply never be completed. Other related failures would impact every service provided by such an isolated switch which made use of the CCS network.

To prevent such catastrophic failures, links in the CCS network are grouped together into "linksets"; linksets are sets of signaling links connecting two nodes in the network which are both redundant, meaning that there is more than one link from point to point, and physically diverse, meaning that the redundant links are never on the same physical facilities at any point between the two ends of the circuit (i.e. two links which are "physically diverse" must never be multiplexed onto the same cable, must never be routed through devices which draw electrical power from the same circuits, must not be placed on two separate cables which travel in the same underground conduit, nor in any other way be subject to a single physical event which might eliminate both links between the two endpoints). Generally, networks are engineered for at least three-way redundancy and physical diversity. This involves great expense and effort; and as the underlying physical facilities change (i.e. two separate fiber optic cables are replaced by a single cable with a higher capacity) great care must be taken to ensure that redundancy and physical diversity are maintained.

Clearly, a means of automatically providing this redundancy and diversity would save great expense and effort, and potentially improve the reliability of the PSTN. Furthermore, as the expense and effort of provisioning and maintaining redundant and physically diverse signaling links is a major factor preventing many smaller carriers (such as small rural telephone companies, competitive local exchange carriers ("CLEC"s), etc.) from adopting the CCS architecture and using it (instead of older methods) to connect to the PSTN, a means of automatically providing this redundancy and diversity would be of great utility to such carriers.

Where other contemporary network architectures deploy many relatively inexpensive, high-performance packet routers, the CCS signaling network generally deploys a small number of extremely large and complex routers each aggregating tens or hundreds of signaling links. A consequence of this architectural decision is that these routers (STPs) are extremely expensive. While the router connecting a local area network to the backbone of a Transmission Control protocol/Internet Protocol ("TCP/IP") network may have four network interfaces (or even less) and cost under $5,000, it is extremely unusual to find a STP with less than dozens of signaling links, and STP prices are at least ten times those of small or midTCP/IP routers. At the same time, STPs offer comparatively little performance to justify their extremely high prices. While even the most inexpensive TCP/IP routers can typically route a message while imposing a delay of less than one millisecond, contemporary overviews of STP architecture and performance discuss message-routing times of ten milliseconds or less as normal.

Efforts have been made to improve upon call handling systems, for example as set forth in U.S. Pat. No. 5,737,404 to Segal. Other systems include those depicted in PCT publications WO 9744962 and WO 9738537.

Clearly, it would be desirable to reduce the cost of STPs while improving their performance. Those are objects of the present invention.

SUMMARY OF INVENTION

The present invention implements a CCS signaling link with inherent redundancy. A pair of devices appear to the CCS network nodes on each end to be a point-to-point digital data link, that is, a normal CCS signaling link. However, while the invention emulates a signaling link for the benefit of the network node to which it is attached, in fact between a pair of devices implementing the invention, multiple transport methods may be used to provide a redundant and diverse path. These methods include the encapsulation of the CCS protocol, at one or more layers, within other network protocols.

The present invention implements a Signal Transfer Point with a "virtual backplane". A typical STP implementation contains multiple front-end processors connected by a dedicated "backplane" message bus or specialnetwork (multiple buses or networks may be used for fault-tolerance) to one or more message routers and control processors. The present invention consists of one or more "encapsulating STPs" ("eSTP"s) which each implement all required SPP functionality. A packet data network using standard packet-switched data protocols, rather than a backplane bus or special-purpose network, connects the encapsulating STPs, and CCS messages are dynamically routed across the internal packet data network to an appropriate eSTP for transmission to the appropriate next-hop address. The entire group of eSTPs appears to be one STP to the CCS network, but on the internal packet data network each eSTP operates as art autonomous message router for CCS traffic. Such a "virtual backplane" STP may be configured minimally as a low-cost high-performance STP with a limited number of links (a single eSTP unit), as a "traditional" STP with redundant "backplanes" and hundreds of links (using many eSTPs at the same physical location, with multiple highlocal area networks such as FDDI or Gigabit Ethernet as the internal data network), or as a "virtual STP", which appears to be a single STP to the CCS network but which is actually at multiple physical locations, with a wide-area network serving as the internal packet data network. The flexibility and modularity achieved by virtualizing the backplane is thus apparent.

Certain prior art systems have been described as networks of microcomputers or minicomputers which perform the STP function in a distributed fashion. The present invention far surpasses these prior art systems in generality, flexibility, performance, and low cost, because of its fully virtualized nature and use of standard, rather than special-networks and protocols. Rather than "distributing" the STP function across a network of small systems each performing only part of the STP function, using a special-purpose message-backplane network, the present invention is fully functional with a single eSTP node or with an arbitrarily large number of nodes. Further, the use of a standard computer data network as a backplane network enables topologies inconceivable with prior art "distributed" STP implementations, for example configurations in which eSTPs of the same CCS node are separated by thousands of miles. The encapsulation of the CCS message traffic in a general-purpose network protocol (for example, TCP/IP) on one or more general-purpose local-area or wide-area networks (such as an Ethernet or a TCP/IP internet) instead of its direct routing onto a special-purpose message-backplane network allows far more configurability, performance, and scalability (in both cost and functionality) than the prior art systems; while eliminating the need for much special-purpose hardware.

DETAILED DESCRIPTION

Figure 1:
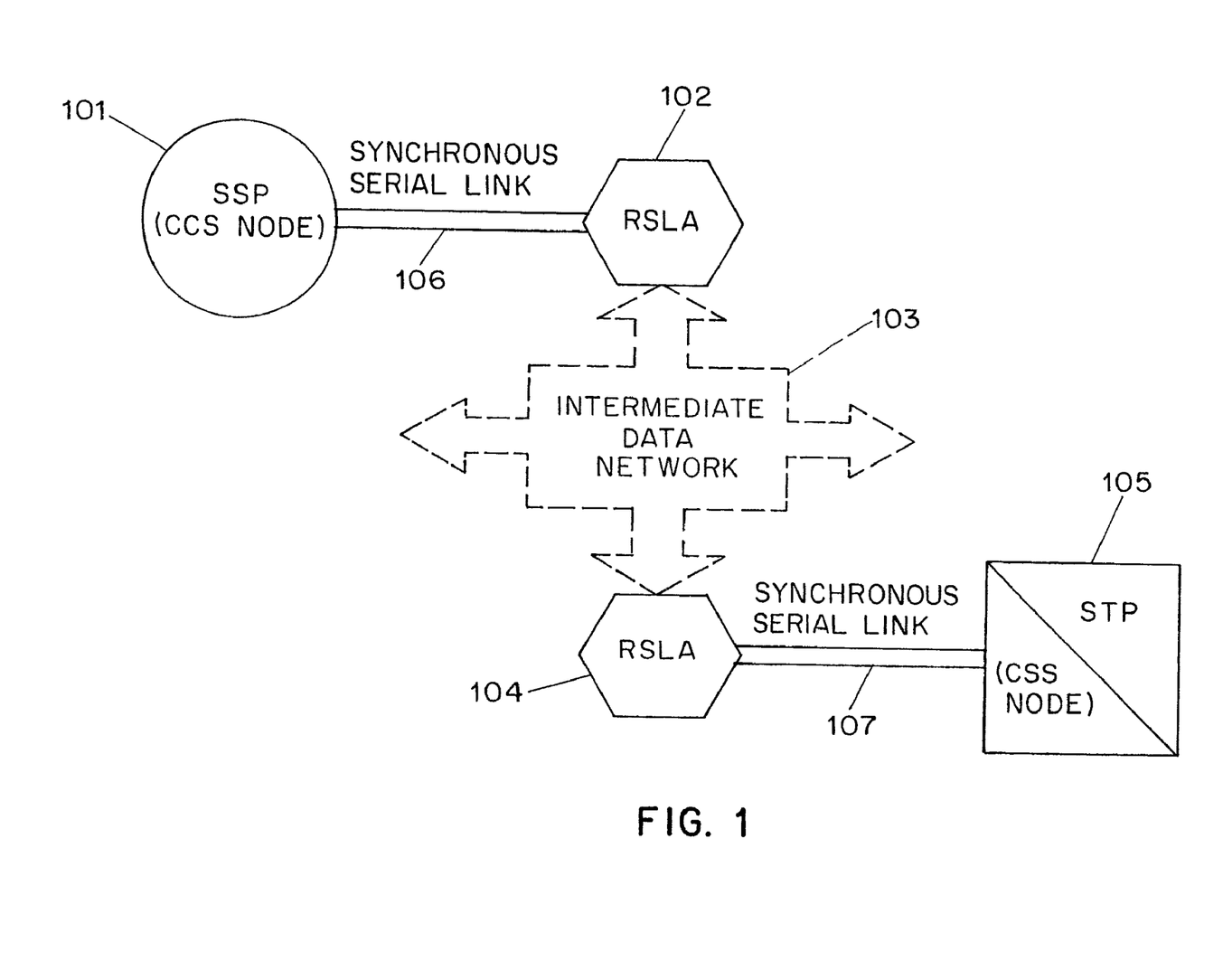
FIG. 1 is a diagram of two CCS nodes connected using the present invention.

We refer initially to FIG. 1 of the drawings.

The invention consists of a pair of Reliable Signaling Link Adapters 102, 104 ("RSLA"s), an intermediate data network 103, and a synchronous serial link 106, 107 connected to each RSLA (for example, a V.35, DSO, DS1, RS449, T1, or E1 link). The RSLAs 102, 104 are hardware/software machines which implement a protocol encapsulation/unencapsulation and optimization ("spoofing") process. An arbitrary CCS network node 101, 105 is connected to the synchronous serial link connected to each RSLA; to the two CCS network nodes 101, 105, the serial links 106, 107, RSLAs 102, 104, and the intermediate data network 103 appear to be a single, point-to-point synchronous serial link.

The communication between the RSLAs 102, 104 is symmetrical; that is, one RSLA 102 encapsulates traffic it receives on its synchronous serial link 106, and sends it across the network 103 to the other RSLA 104, which unencapsulates it and transmits it on its synchronous serial link 107; simultaneously, the second RSLA 104 receives traffic on its synchronous serial link 107, encapsulates it, sends it across the network 103 to the first RSlJA 102, which unencapsulates it and transmits it on its synchronous serial link 106.

Redundancy is provided by fail-over at either RSLA 102, 104 should it detect a failure of network connectivity in the intermediate data network 103. With connection-oriented network protocols, for example, a failure would be detected should the connection close. A failure may also be detected should latency in the network rise to unacceptable levels, or should data loss or corruption be detected.

An RSLA 102, 104, should it detect a failure of its connectivity to the other RSLA 104, 102 or to the intermediate data network 103 itself, will immediately attempt to reestablish connectivity. Multiple connectivity methods may be configured; for example, should an Ethernet link fail, connectivity might be restored via a satellite link. The connectivity methods configured are limited only in that they must be supported by the intermediate data network 103 in use. So long as any connectivity method is available, the RSLA 102, 104 will attempt to use it to maintain or reconnectivity. In an embodiment thought to be particularly advantageous, connectivity methods are assigned priorities; the method with the highest priority will always be used if available. This allows expensive switched data circuits, for example, to be used only if less costly leased lines (which would, in this example, have a higher priority) are out of service.

Additional redundancy is provided by the underlying facilities of the intermediate data network 103. For example, in an Internet Protocol ("IP") network, network failures are healed by automatic routing procedures which reroute traffic using other paths in the network. Routers within the intermediate data network 103 may also automatically activate or deactivate additional or backup network links or circuits as required. These methods are well-known of those skilled in the art; it is the encapsulation of the CCS network protocol in the protocol of another network (the intermediate data network 103) which enables their use to provide automatic redundancy for point C-to-point CS links.

Figure 3:
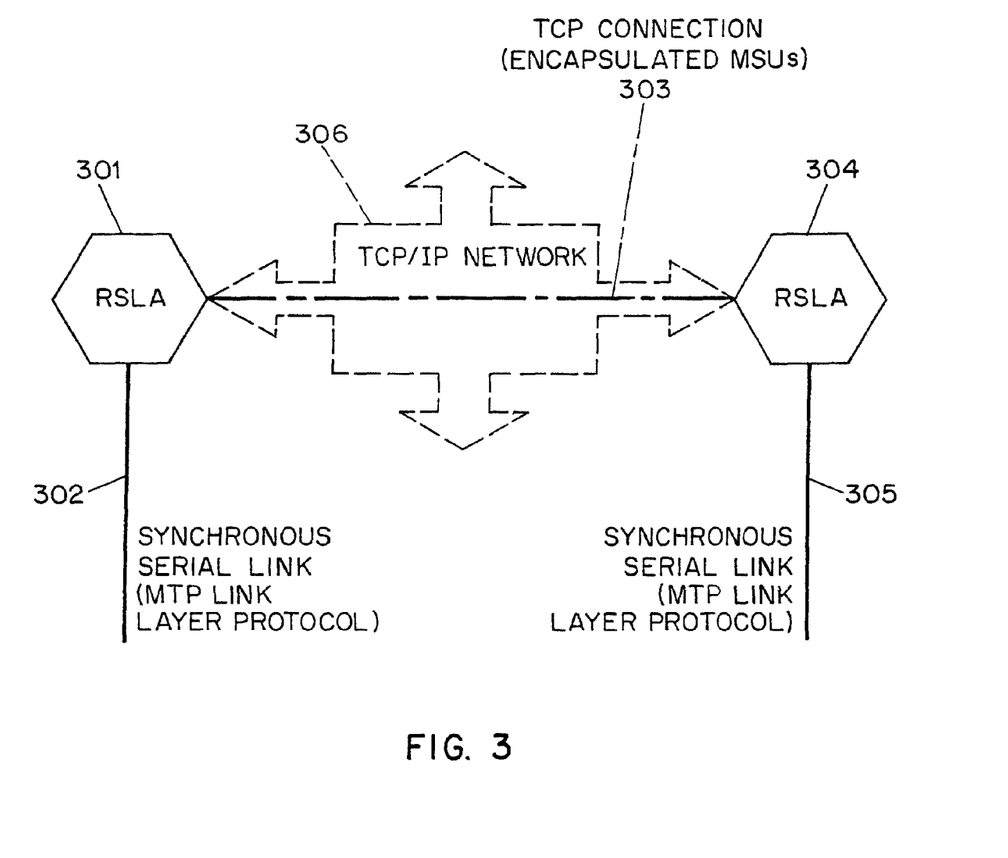
FIG. 3 is a diagram showing physical and logical data connections in the preferred embodiment of the invention.

In the preferred embodiment of the invention, referring now to FIG. 3, the link layer CCS protocol (in the present C-day CS, Message Transfer Part, Level 2, "MTP") is encapsulated in the Transmission Control Protocol ("TCP"). Linkp-layer protocol packets are received on a synchronous serial link 302, encapsulated in TCP, and transmitted across a Transmission Control Protocol/Internet Protocol ("TCP/IP") network 306 to the other RSLA 304. At the other RSLA 304, the TCP stream 303 is received, divided into link layer CCS packets, and reo-transmitted n a synchronous serial link 305.

In a less preferred embodiment, rather than directly encapsulating the link layer CCS packets in a TCP/IP stream, Generic Route Encapsulation ("GRE", an Internet Standard) may be used.

In another less preferred embodiment, User Datagram Protocol ("UDP", an unreliable datagram protocol) encapsulation may be used.

In still another less preferred embodiment, direct Point to Point Protocol ("PPP") encapsulation may be used.

In one embodiment, referring now to FIG. 1 the encapsulated data sent across the intermediate network 103 between the RSLAs 102, 104 is encrypted with one or more encryption algorithms; it is decrypted upon receipt. Data which does not decrypt correctly is discarded. In another embodiment, no encryption or decryption are performed.

In one embodiment, data encryption is performed explicitly in the course of the encapsulation process; for example, data is explicitly encrypted before being submitted to TOP for transmission. In another embodiment, it is performed implicitly by the network layers underlying the protocol in which the CCS data is encapsulated; for example, the CCS data might be encapsulated in GRE, and the GRE packets might be carried in IP datagrams encrypted using the standard IPSEC protocols.

Figure 2:
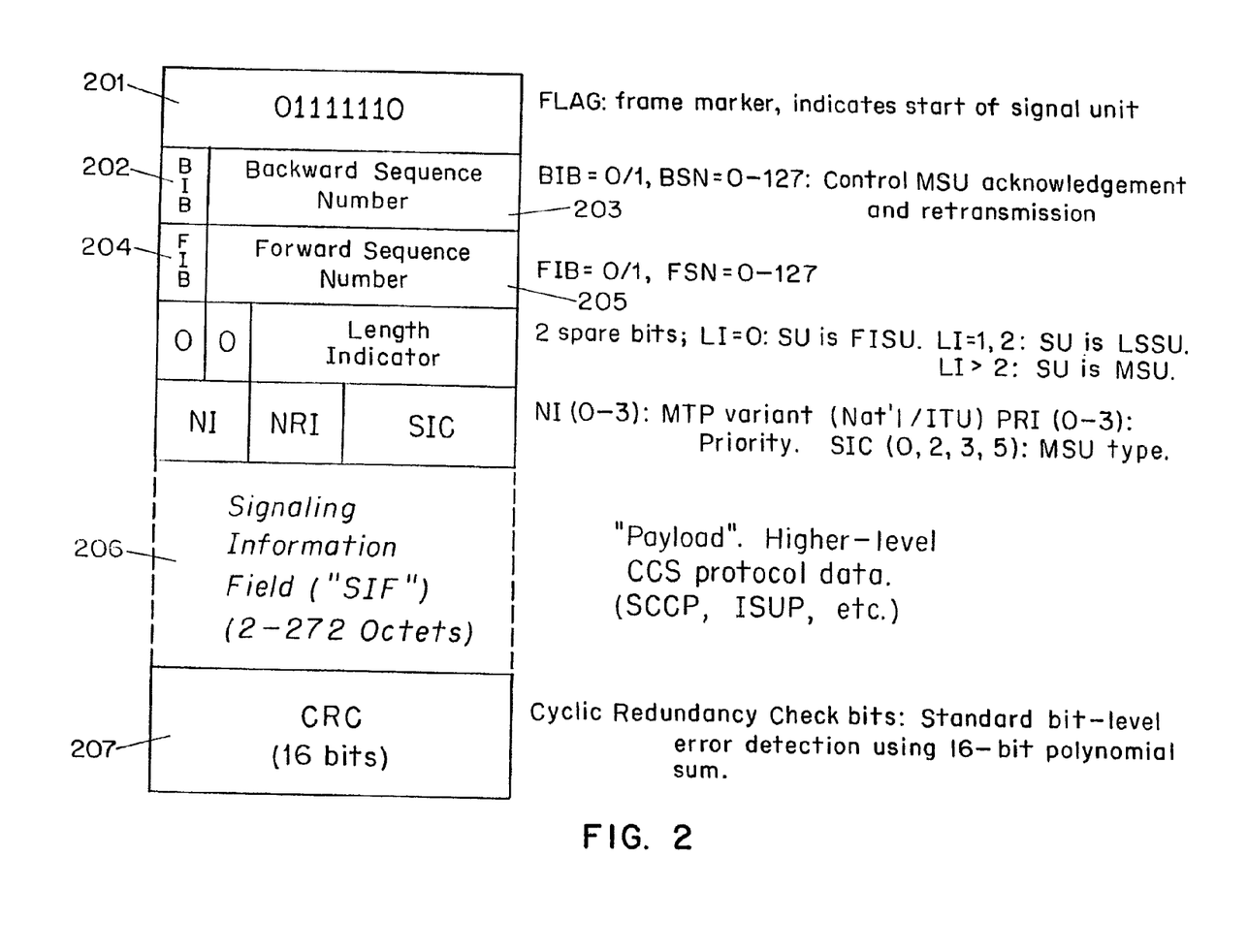
FIG. 2. is a diagram of a Message Transfer Part signal unit, with consecutive octets arranged vertically from top to bottom.

Referring now to FIGS. 2 and 3 of the drawings, to meet timing constraints imposed by the architecture of the CCS network, as well as for efficiency reasons, a protocol optimization or "spoofing" method may be used at each synchronous serial link 302, 305; some packets may be discarded or processed locally without ever being encapsulated or transmitted across the data network 306.

The spoofing method is specific to the linkprotocol in use, as well as certain protocol options. The following is a discussion of the spoofing method used in the preferred embodiment, with the ANSI/Bellcore National variant of MTP.

There are three types of MTP packets (or signal units), Message Signal Units ("MSU"s), Link Status Signal Units ("LSSU"s), and FillS-in signal Units ("FISU"s). FillS-in signal Units are used to maintain link synchronization and reliability. MTP requires that they be transmitted on the synchronous serial link 302, 305 whenever there is nothing else to transmit; this requirement is one of the major differences between MTP and most other synchronous linkprotocols; most other protocols transmit only the "frame marker" or "FLAG" octet 201 (binary 01111110) to maintain synchronization. The spoofing method discards all FISUs upon receipt; to maintain compliance with the MTP protocol, FISUs are transmitted on each synchronous serial link when there is no other data to send, but they are not encapsulated and sent across the TCP/IP network 306 when received; they are locally generated at each RSLA 301, 304.

Link Status Signal Units have three functions: Link Alignment, which is verification that the link can transport valid 8p-bit patterns (flags, status, etc.) to support the linkplayer protocol, for fixed time periods without exceeding error thresholds, Flow Control, which controls receive buffer congestion, and Processor Outage indication, which notifies the receiver of the Processor Outage LSSU that the transmitter is suffering a hardware or software failure.

Link Alignment LSSUs are not encapsulated or transmitted across the TCP/IP network 306 to the other RSLA 304, 301, if received on the synchronous serial link 302, 305. Rather, the MTP link and link procedures are performed locally by each RSLA 301, 304 for its connected synchronous serial link 302, 305. It may be desirable for the remote RSLA 304, 303 to receive notification that the serial link on its partner 301, 304 has failed or restarted; two methods for this are envisioned. In the first method, the failure of the serial link 302 connected to an RSLA 301 causes that RSLA 3031 whose link 302 has failed to drop the TOC connection 303 to the other RSLA 304. It will neither initiate a new TOC connection 303 nor accept one initiated by the other RSLA 304 until the synchronous serial link 302 is restarted and MTP is in alignment. In the second method, a change in link status causes transmission of a "link status message" a cross a second, parallel TCP Connection between the two RSLAs 301, 304; this message gives the current link status (in alignment, out of alignment, carrier, no carrier, etc.).

Flow Control LSSUs are similarly handled locally, by buffering data at the RSLA 301, 304 which has received the Flow Control LSSU. They are not encapsulated or sent across the TCP/IP connection 303 to the remote RSLA 304, 301. Processor Outage LSSUs are handled by, in one embodiment, sending a message across a second, parallel TCP connection (the same one used in the corresponding embodiment for Link Alignment LSSUs above) indicating that a processor outage has occurred; in a second embodiment the TOP connection 303 is dropped, and the RSLA 301, 304 which has received the Processor Outage LSSU will neither initiate a new TOC connection 303 nor accept one initiated by the remote RSLA 304, 301 until the Processor Outage error condition has been cleared.

Outages of the TCP/IP connection 303 may require LSSUs to be locally generated by an RSLA 303, 304. TI this case, the RSLA 301, 304 will generate Flow Control, Link Alignment, or Processor Outage LSSUs (as appropriate) and transmit them on the connected synchronous serial link 302, 305. Message Signal Units carry the actual data used at higher levels of the CCS network protocol stack (for example, Signaling Connection Control Protocol ("SCCP"), Unit Data ("UDT"), Integrated Services Digital Network User Part ("ISUP" or "ISDNUP"), or Telephony User Part ("TUP") messages) 206. Message Signal Units are the only MTP Signal Units which are always encapsulated and sent across the TCP connection 303 to the remote RSLA 304, 301. Mowever, even for MSUs, the entire signal unit received on the synchronous serial link is not necessarily encapsulated and transmitted; nor is the MSU transmitted by the RSLA 304 which has received it in encapsulated form on its TCP connection 303, on its synchronous signaling link 305, necessarily identical to the one received by the RSLA 301 which encapsulated it and sent it across the TOC connection 303, on its synchronous signaling link 302.

At least the FLAG octet 203 and Cyclic Redundancy Check ("CRC") bits 207 are always stripped from any MSU before encapsulation. The FLAG octet 201, which marks the beginning of a signal unit in the bit-stream MTP protocol, serves no purpose in the byte-stream TOC protocol. The 16-bit (two-octet) CRC sequence 207 is redundant because TOC itself guarantees data integrity.

The Forward Sequence Number 205 and Backward Sequence Number 203 ("FSN", "BSN") or each MSU are, in one embodiment, removed from the MSU before encapsulation; in another embodiment they are replaced with zero values. The FSN and BSN are managed locally at each RSLA 301, 304 in accordance with the MTP protocol; that is, each new signal unit transmitted by a RSLA 301, 304 on its connected synchronous serial link 302, 305 will have the next FSN 205 value (where "next" is defined as the last value transmitted plus one modulo 128 for a MSU, or the last value transmitted, for any nonsignal unit) inserted as its FSN 205, and the last correctly received FSN 205 value (that is, the value of the FSN 205 from the last MSU correctly received on the synchronous serial link 302, 305) inserted as its BSN 203.

The Forward Indicator Bit 204 and Backward Indicator Bit 202 are, in one embodiment, removed from the MSU before encapsulation; in another embodiment they are replaced with zero values. The FIB 204 and BIB 202 are managed locally at each RSLA 301, 304 in accordance with the MTP protocol; that is, each signal unit transmitted by a RSLA 301, 304 on its connected synchronous serial link 302, 305 will have the current FIB 204 and BIB 202 values (binary "1" or "0" depending on link state) inserted as its FIB 204 and BIB 202.

It should be evident to one skilled in the art that the above procedures are roughly equivalent to an implementation of MTP for a hybrid STP with one synchronous serial link and one TOC encapsulated CCS link. In fact, it is envisioned that the RSLA 102, 104 may function in the network as one or more STPs, in which case the MTP protocol will not be spoofed; rather, the pair of RSLAs 102, 104 will appear to be one or more STPs, instead of a mere synchronous serial link. One noteworthy difference between the spoofing method given above and the embodiment in which the RSLAs 102, 104 simply appear to the connected CCS network nodes 101, 105 to be one or more STPs is related to the handling of Signaling Link Selection ("SLS"); while an STP must perform SLS, and modify the SLS value in MSUs it handles, the RSLA 301, 304 does not modify the SLS of MSUs when using the spoofing method given above; to do so would cause incorrect emulation of a points-to-point serial link, creating the appearance that at least one additional CCS network node had been inserted in the message path.

In an alternative embodiment of the invention, what is provided is a machine for routing Message Transfer Part ("MTP") or substantially similar CCS messages; it is composed of hardware and software parts. The principal components of the invention are one or more eSTPs and one or more packet data networks, such as ethernet or FDDI networks. Each of these components has several internal sub-components; additionally, the packet data networks operate generally according to the procedures of one or more standard packet-switched network data protocols, such as Internet Protocol (version four or version six) ("IP"), Asynchronous Transfer Mode ("ATM"), Point-to-Point Protocol ("PPP"), or Ethernet.

The sub-components of the eSTP are at least as follows: A computer processor, means such as hard disk or flash memory for persistent program storage, random-access memory, a peripheral bus, one or more interfaces for connection to one or more packet-switched data networks such as Ethernet, ATM, or FDDI interface cards, one or more interfaces for connection to synchronous serial communication links such as TI, EI, RS423, V.35, or DS0, message-routing software, routing-table management software, software for performing CCS "Global Title Translations" and managing associated tables, and software for handling exceptional conditions. Optionally, hardware or software for performing data encryption functions may be a sub-component of the eSTP. Additional standard hardware and software as generally found in a microcomputer running a multitasking operating system or substantial equivalent will be present, for example an asynchronous serial "console port" for debugging and control purposes, and system software for process management and bootstrapping.

The sub-components of the data networks are as follows: network cabling, for example fiber optic or copper cable, one or more network routers or switches (which are connected to each other and to the eSTPs by the network cabling), for example Cisco Systems model 3620 routers or model 5500 Ethernet switches, and one or more network protocols such as IEEE 802.3 Ethernet, ATM, Transmission Control Protocol ("TCP"), Generic Route Encapsulation ("GRE"), IP, or Open Systems Interconnect ("OSI"). In the preferred embodiment these network protocols support a multicast mode, in which a packet may be addressed to a subset of the nodes (e.g. eSTPs or routers) connected to the network without having to be transmitted once per node. In a less preferred embodiment, the protocols support at least a broadcast mode, in which a packet may be addressed to all nodes connected to the network without having to be transmitted once per node. In a still less preferred embodiment, the protocols of the data network support neither a multicast nor a broadcast mode.

The invention is activated when a CCS message (typically, a Message Transfer Part ("MTP") Message Signal Unit ("MSU")) is received on a synchronous serial link of an eSTP. The message is passed to the message routing software. The message routing software first compares the destination point code ("DPC", the CCS terminology for a destination network address) of the message to the signaling point code or point codes of the invention itself.

If the DPC of the message initially received on the synchronous serial link is a point code of the invention (that is, it matches a CCS address ("point code") assigned to the "virtual backplane SPP" itself) the message is either a message indicating exceptional conditions, or requires Global Title Translation ("GTT"), a form of network address translation. The GTT and exceptional conditions software components of the eSTP are described at the end of the description of normal message handling procedures (that is, procedures for messages whose DPC is not that of the STP itself).

If the DPC of the message does not match a CCS point code assigned to the invention, the message routing software searches for the DPC in a routing table, for example a hash table, LC trie or radix trie. In the preferred embodiment, the routing table is an LC trie, and the search terminates at the node in the trie which represents the most exact match. The output of this search may be in one of two forms: it may select either a synchronous serial link on the same CSTP, or the address, in the addressing format of a network protocol in use on an internal data network, of another eSTP. If the output of the search is a synchronous serial link on the same eSTP, the message is transmitted on that synchronous serial link, thus completing message routing and deactivating the invention. If the output of the search is the address of another eSTP, the message is encapsulated in the protocol in use on the internal data network (that is, the CCS message becomes the payload (the portion excluding the headers, checksum, and other control information) of one or more messages of the internal data network protocol in use) and transmitted to the other eSTP. In one embodiment, the message is encrypted or otherwise reversibly transformed (for example, compressed) before transmission; in another embodiment, this transformation does not occur.

The encapsulated message is handled by the data network in accordance with its protocol (for example, Ethernet frames may be switched based on IEEE 802.3 address by a network switch, or IP packets may be routed by an IP router) and thereby delivered to the eSTP whose address was the output of the routings-table search. That eSTP receives the encapsulated message and reverses the encapsulation process and any reversible transformation as discussed above (yielding a CCS messages, unencapsulated in any other network protocol, exactly or substantially equivalent to the originally received message which activated the invention) and then handles it in the same manner as the first eSTP to handle the message (that is, the eSTP which received it on a synchronous serial interface): the message is received on the internal packet data network interface, the DPC is examined and compared to those of the invention itself, then looked-up in the routing table; the message is disposed of as indicated in the routing table. In a preferred embodiment, messages are never retransmitted on the same interface on which they arrived; that is, messages received on a synchronous serial link are never retransmitted on the same synchronous serial link, and messages received on an interface to an internal packet data network are never re-encapsulated and retransmitted on that same interface to that same internal packet data network; if this is the action indicated by the routing table search, the message is simply discarded. In another embodiment, this special treatment is not applied. In one embodiment, the DPC of the message received from an internal packet data network is not compared to those of the invention itself, and the message is not examined to see whether or not Global Title Translation is required, because these steps would be redundant, having been performed by the initial eSTP to receive the message on a synchronous serial interface. In another embodiment (as described earlier in this paragraph) these steps are performed and, after any message received on an internal data network is unencapsulated and any reversible transformation is reversed, message handling is exactly as it would be had the message been received on a synchronous serial link.

In certain CCS signaling systems (for example, in the ANSI/Bellcore Signaling System number Seven ("SS7") as well as other closely related signaling systems) a field is present in the MTP header known as the Signaling Link Selection ("SLS") field. When receiving such a CCS message, requirements for these CCS signaling systems specify that the value of the SLS field is to be used to select between multiple signaling links with the same destination, if such multiple links are present. The SLS value is to be used to choose the synchronous serial link to retransmit the message upon, modified in the manner specified in the standard (for example, the Bellcore GR-246-CORE standard specifies that the contents of the field are to be rotated bitwise), and this modified value is to be used (replacing the original field value in the message as it was received) in the message which is ultimately transmitted on the appropriate synchronous serial link. When such SLS requirements apply, the invention may apply various methods in order to conform. In one embodiment, there may be multiple copies of the routing table, one per SLS value. In an alternate embodiment, the SLS may be used to select among multiple values returned by the routing table lookup. In another embodiment, the SLS may be treated as part of the DPC, for example by appending it to the DPC after the least significant hit of the address. In yet another embodiment, the internal packet data network addresses stored in the routing table may be multicast addresses, and packets may be multicast to several eSTPs, being processed only by the eSTP with the attached serial link corresponding to the correct SLS value. In still another embodiment, all links to a particular destination may be aggregated on one or more eSTPs (thereby using unicast or multicast addressing modes on the internal packet data network), which will receive the packet and then select the appropriate link accordingly. In one more embodiment, the SLS value may be ignored. Regardless of the embodiment used to select an eSTP or link to which to transmit the message based upon the original SLS value, the SLS value is always modified (for example, by the Bellcore-specified bitwise rotation over five bits) by the final eSTP to handle the message, that is, by the eSTP which finally transmits it to another CCS node on a synchronous serial link.

It is possible to think of the STP formed by the eSTPs as a "cluster" of eSTPs, each of which can independently route CCS messages, but which share one or more CCS point codes (also referred to as "signaling point codes" and, in the case of codes assigned to multiple nodes, "alias point codes") and act as one node to the CCS network. It is, of course, also possible to configure a set of eSTPs in multiple clusters, with multiple CCS point codes, so that they will appear to be multiple nodes (multiple, separate STPs) to the CCS network. In this case message routing. is as above, except that an "internal data network" route for a message may in send the encapsulated message to an eSTP which has a different signaling point code or, in the "cluster" terminology, which is "part of a different cluster". This distinction is important to understand because of the mechanisms by which routing and Global Title Translation ("GTT") table updates occur. While multiple eSTPs on the same internal packet data network may exchange encapsulated CCS traffic as if they were part of the same CCS node (that is, CCS nodes which implement the invention may exchange traffic across the "internal packet data network" as well as across the traditional synchronous serial links) such eSTPs share their routing table and GTT tables only with eSTPs which are in the same "cluster" or CCS node as themselves, that is, only those eSTPs which share their same CCS signaling point codes. It is important to understand that multiple independent instances of the invention may share a CCS "alias point code"; a "cluster" of eSTPs implementing one instance of the invention must share all assigned point codes, not only alias point codes, and mere sharing of an alias point code does not mean that two eSTPs are in the same cluster.

Global Title Translation, in CCS, is a process in which "generic" or nonspecific addresses may be used in CCS messages to address packets to services for which the DPC is unknown by the message originator. The message is sent by the originator to an STP, with a flag in the message indicating that GTT is required, and ancillary message data which will be used by the GTT-performing STP to determine the specific destination address for the message. The invention implements GTT, with enhancements over the common static-table implementation used by prior art STPs.

When an eSTP receives a message with the CCS DPC of the eSTP itself, and that message has the appropriate values in the appropriate fields to indicate that GTT is required, the message is passed to the global title translation software on that eSTP. Each eSTP can perform GTT from local tables which map GTT values (typically calling/called party address and translation table number) to a new CCS destination address. In this embodiment, the eSTP simply searches the table for a matching entry and inserts the appropriate values in the CCS message, which is then forwarded as if it had been received in its new form on a synchronous serial link or internal packet data network interface (e.g. the new DPC is looked up in the routing table, etc.). If no matching entry is found, a new CCS message is generated indicating error, which is routed to the CCS node whose address was in the OPC (CCS source address) field of the message requiring GTT. In this embodiment, the local GTT tables may be updated by multicast messages from any other node on the internal packet data network; these update messages may be cryptographically signed. In another embodiment, GTT lookup is performed using the distributed, cached database methods of the Domain Name Service ("DNS"), an Internet Standard. GTT tables are divided hierarchically (f or example, by successive digits or groups of digits within the Called Party Address). Each eSTP has a cache of recent GTT results; permanently resident in this cache are the records ("hints") for the top level of the DNS hierarchy containing the GTT tables. When an eSTP requires a GTT table entry which is not resident in its cache, it descends the DNS hierarchy used for GTT until it reaches a DNS server which has a matching entry, or until it discovers that there is no such entry. Entries thus retrieved (or which for which retrieval tailed) are cached, resulting in dramatically reduced network traffic and database query load for repeated CCS messages requiring the same global title translation. Message routing (or the generation and routing of an error message) is the same for this embodiment as for the embodiment in which GTT is performed from a table local to each eSTP. In this embodiment, clearly DNS servers containing the GTT data are required. In one embodiment, every eSTP is a DNS server, containing all the required GTT data; two or more eSTPs are designated (for example, manually or by election using a broadcast or multicast group on the internal data network) as the master DNS servers, and the other eSTPs use normal DNS procedures to synchronize to them. In another embodiment, a multicast group is used to elect multiple eSTPs to be DNS servers, and all other eSTPs cache data only. Should one of the DNS server eSTPs fail to respond to DNS queries, a new election is performed, with the appropriate data transferred by normal DNS methods from one or more of the surviving DNS servers. It is envisioned that in still another embodiment, an automatic procedure would distribute distinct data at each level of the hierarchy to at least three eSTPs per DNS table, and dynamically construct the top-of-hierarchy DNS "zone file", which would be resident in every eSTP; in this embodiment an automatic equalization of query load between eSTPs in a cluster can be achieved, without the necessity of providing each eSTP with a full copy of the GTT data.

The selection of a route for a particular CCS message, as discussed earlier, is performed by lookup in a table or other data structure, such as an LC-trie, radix trie, or hash. The methods for performing such a lookup are specific to each particular data structure and are well-known to those skilled in the art. Similarly, insertion of particular routes in the routing table data structures is specific to each type of data structure which might be used, and for each type is well-known to those skilled in the art. The generation and distribution of data to insert in (or remove from) the routing table data structure on each eSTP, however, is somewhat more complex.

Traditional CCS STPs have used "static routing tables", that is, routing tables with entries which changed only when explicitly modified, for example by logging in to the STP and modifying table values, or by using a generally equivalent administrative interface. Though cumbersome and potentially error-prone, this method is very simple. In one embodiment, the invention may have its routing table data maintained in this manner. In an embodiment thought to be particularly advantageous, however, the invention uses a dynamic routing protocol to synchronize routing information between eSTPs. In this embodiment, each eSTP sends information on its external neighbors (that is, other CCS nodes or networks to which it is connected) to the other eSTPs in the cluster. Each eSTP then uses its own local routing information (its knowledge of its own neighbors) and the information received from the other eSTPs to compute a comprehensive routing table. This process occurs periodically.

It is believed to be preferable to use a standard routing protocol such as Open Shortest Path First ("OSPF"), Intermediate SystemSystem ("IS"), Routing Information Protocol ("RIP") or Interior Gateway Routing Protocol ("IGRP") to share routing table information between eSTPs and to maintain routing table information on each eSTP. It is believed to be particularly advantageous to use a "link" protocol such as OSPF or ISwhere each eSTP computes a complete graph of connectivity for all eSTPs before modifying its routing table data structures, instead of a "distance" protocol such as RIP or IGRP, but either type of routing protocol is acceptable for use with the invention. The routing protocol used must support the addressing formats in use on the CCS network (such as 24ANSI/Bellcore SS7 point codes) and the internal data network (such as 32-bit IP version 4 addresses); this may require slight modification to an existing standard routing protocol to render it suitable for use with the invention.

As is common with routers for other network protocols, routing data received from the routing protocol may be filtered, modified, or augmented by locally maintained routing data (for example, "static" routes) before it is used to populate the routing table data structure used to route CCS messages. A typical algorithm is for an eSTP to advertise its own neighbor nodes and networks to the other eSTPs (for example, using OSPF over a multicast group on the internal data network), receive advertisements sent by the other eSTPs, reconcile those other eSTPs elate with its own edtea including some set of unadvertised static routes or other local rules for modification, then use that modified data to repopulate the routing table data structure. The repopulation may be whole or partial; that is, the entire data structure may be replaced by a new data structure containing the new data, or individual entries may be added, deleted, or modified to achieve the same result.

The final component of the invention is software for handling CCS messages which indicate exceptional conditions. These messages may be messages relating to error or restart conditions on a particular synchronous serial link (for example, MTP Link Status Signal Units), or notification messages relating to the state of other CCS network nodes or their links (for example, MTP Network Management ("MTP") messages) or other messages indicating exceptional conditions. Upon receipt of such a message, it is forwarded to a software task in the local eSTP which processes such messages. That software task will first cause local eSTP behaviour to conform to CCS requirements for the exceptional message in question (for example, by initiating link restart procedures, by shutting clown the link in question, or by removing a remote CCS node from the routing table) and then, for messages which are relevant to other eSTPs (such as MTP-NM Change Over or Change Back messages, which may require routing table changes in every eSTP) retransmits the message on the appropriate internal packet data network, preferably as a multicast or broadcast message. In a preferred embodiment, certain particularly common or important messages (for example Change Over and Change Back) may not be retransmitted using the normal encapsulation for CCS messages, but rather may cause changes to data transmitted using another protocol, such as the dynamic routing protocol in use, if any.

Figure 4:
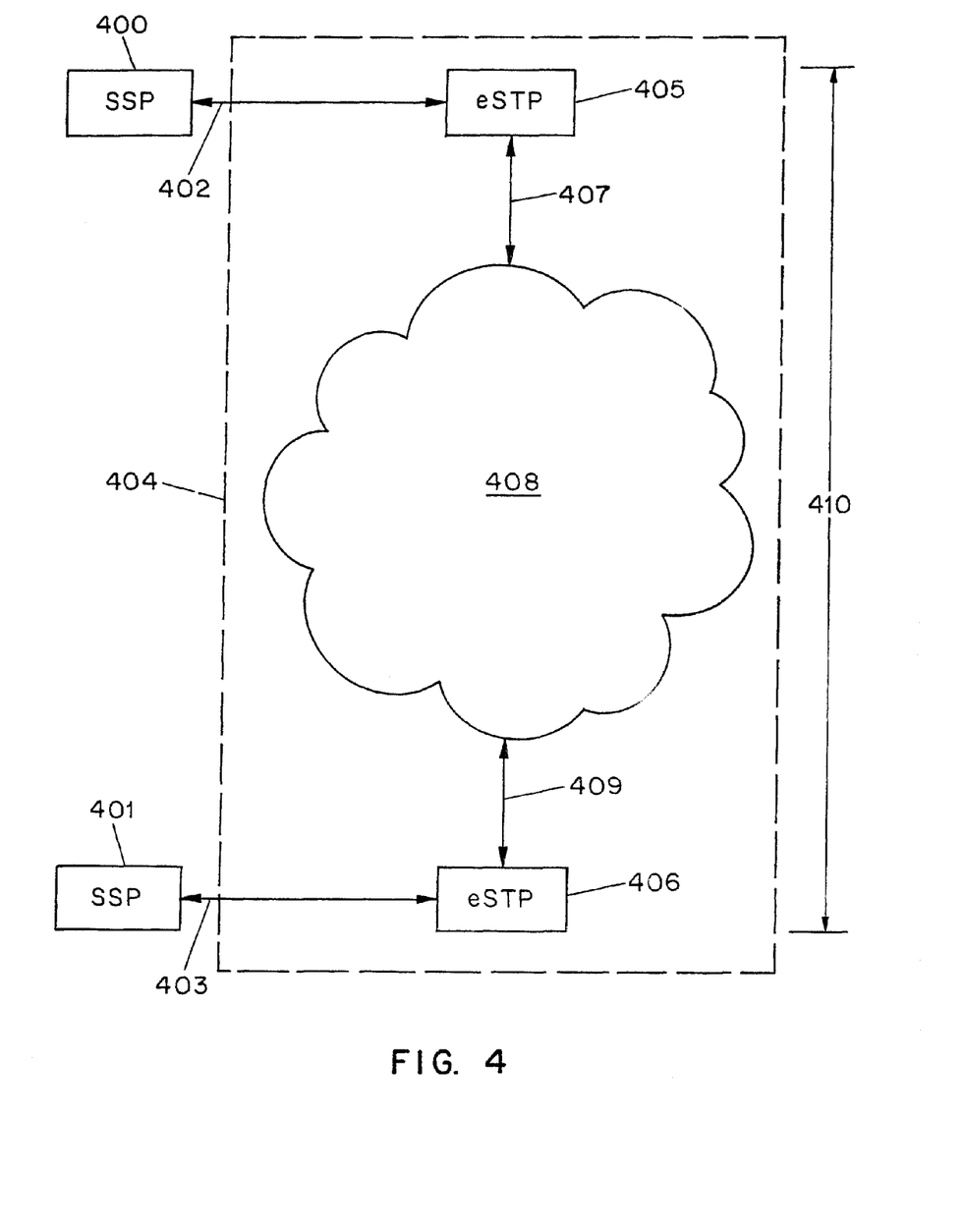
FIG. 4 is a functional block diagram showing a second embodiment of the invention.

Turning now to FIG. 4, what is shown is a functional block diagram of an alternative embodiment of the invention. Voice switches or SSPs 400, 401 are communicatively coupled via signaling links 402, 403 with eSTPs 405, 406. Each eSTP may be coupled via additional signaling links to additional SSPs, omitted for clarity from FIG. 4. In addition, each eSTP is coupled via respective communications channels 407, 409 to a wide-area network 408, typically an internet. The wide-area network 408 may preferably be a high-quality-of-service internet or may less preferably be the Internet. Dimension line 410 represents the large physical separation that may well obtain between any two eSTPs 405, 406. It should be appreciated that in an exemplary embodiment there will be numerous additional eSTPs, omitted for clarity in FIG. 4.

Importantly, from the point of view of an arbitrarily selected SSP 400, 401 its CCS communications are indistinguishable from those which would take place were the SSP connected to a prior-art STP. Stating this differently, two SSPs 400, 401 will communicate and function when connected as shown in FIG. 4 just as if they were connected to a single STP taking the place of virtual boundary 404. In this way, the eSTPs 405, 406 and wide-area network 408 may be said to comprise a virtual STP 404.

The present invention has been described with respect to several variations of possible embodiments which are not meant to and should not be construed to limit the invention.

The invention claimed is:

1. A data communications system comprising first and second apparatus, each of said first and second apparatus having a respective port disposed for sending and receiving common channel signaling data for telephone call processing, the first and second apparatus connected by a packet-switched communications channel, said channel of a type routing messages over an arbitrary path comprising hops including a final hop, said channel of a type in which the final hop of a path is not fully known in advance; each of said first and second apparatus further comprising:
   means for receiving common channel signaling data via its respective port, encapsulating said common channel signaling data in packets, and transmitting said packets to said packet-switched communications channel;
   each of said first and second apparatus further comprising:
   means for receiving said packets from said packet-switched communications channel, stripping flag octet and cyclic redundancy check bits therefrom before encapsulation, extracting said common channel signaling data from said packets, and transmitting said common channel signaling data via its respective port
   wherein the first and second apparatus are further connected by an on-demand communications channel; each of said first and second apparatus further comprising means testing the packet-switched communications channel, and responding to a failed test of the packet-switched communications channel by establishing the on-demand communications channel;
   the means for receiving common channel signaling data via the respective port of the first and second apparatus responsive to the failed test by transmitting said encapsulated packets to said on-demand communications channel;
   the means for receiving said packets from said on-demand communications channel responsive to the failed test by extracting said common channel signaling data from said packets, and transmitting said common channel signaling data via the respective ports of said first and second apparatus.

2. The system of claim 1 wherein the failed test of the packet-switched communications channel comprises excessive latency in the packet-switched communications channel.

3. The system of claim 1 wherein the on-demand communications channel is ISDN.

4. A data communications system comprising first and second apparatus, each of said first and second apparatus having a respective port disposed for sending and receiving common channel signaling data for telephone call processing, the first and second apparatus connected by a packet-switched communications channel, said channel of a type routing messages over an arbitrary path comprising hops including a final hop, said channel of a type in which the final hop of a path is not fully known in advance; each of said first and second apparatus further comprising:
   means for receiving common channel signaling data via its respective port, encapsulating said common channel signaling data in packets, and transmitting said packets to said packet-switched communications channel;
   each of said first and second apparatus further comprising:
   means for receiving said packets from said packet-switched communications channel, stripping flag octet and cyclic redundancy check bits therefrom before encapsulation; extracting said common channel signaling data from said packets, and transmitting said common channel signaling data via its respective port
   wherein the packet-switched communications channel is a TCP/IP internet.

5. A data communications system comprising first and second apparatus, each of said first and second apparatus having a respective port disposed for sending and receiving common channel signaling data for telephone call processing, the first and second apparatus connected by a packet-switched communications channel, said channel of a type routing messages over an arbitrary path comprising hops including a final hop, said channel of a type in which the final hop of a path is not fully known in advance;
   each of said first and second apparatus further comprising:
   means for receiving common channel signaling data via its respective port, reversibly transforming said data, encapsulating said transformed common channel signaling data in packets, and transmitting said packets to said packet-switched communications channel;
   each of said first and second apparatus further comprising:
   means for receiving said packets from said packet-switched communications channel, extracting said common channel signaling data from said packets, reverse-transforming said data, and transmitting said common channel signaling data via its respective port
   wherein the first and second apparatus are further connected by an on-demand communications channel;
   each of said first and second apparatus further comprising means testing the packet-switched communications channel, and responding to a failed test of the packet-switched communications channel by establishing the on-demand communications channel;
   the means for receiving common channel signaling data via the respective port of the first and second apparatus responsive to the failed test by transmitting said encapsulated packets to said on-demand communications channel;
   the means for receiving said packets from said on-demand communications channel responsive to the failed test by extracting said common channel signaling data from said packets, and transmitting said common channel signaling data via the respective ports of said first and second apparatus.

6. The system of claim 5 wherein a failed test of the packet-switched communications channel comprises excessive latency in the packet-switched communications channel.

7. The system of claim 5 wherein the on-demand communications channel is ISDN.

8. A data communications system comprising first and second apparatus, each of said first and second apparatus having a respective port disposed for sending and receiving common channel signaling data for telephone call processing, the first and second apparatus connected by a packet-switched communications channel, said channel of a type routing messages over an arbitrary path comprising hops including a final hop, said channel of a type in which the final hop of a path is not fully known in advance;

each of said first and second apparatus further comprising:
means for receiving common channel signaling data via its respective port, reversibly transforming said data, encapsulating said transformed common channel signaling data in packets, and transmitting said packets to said packet-switched communications channel;

each of said first and second apparatus further comprising:
means for receiving said packets from said packet-switched communications channel, extracting said common channel signaling data from said packets, reverse-transforming said data, and transmitting said common channel signaling data via its respective port wherein the packet-switched communications channel is a TCP/IP internet.

9. A method for use with a data communications system comprising first and second apparatus, each of said first and second apparatus having a respective port disposed for sending and receiving common channel signaling data for telephone call processing, the first and second apparatus connected by a packet-switched communications channel, said channel of a type routing messages over an arbitrary path comprising hops including a final hop, said channel of a type in which the final hop of a path is not fully known in advance; the method performed within each apparatus comprising the steps of:

receiving common channel signaling data via the respective port,
reversibly transforming said data;
encapsulating said transformed common channel signaling data in packets, and
transmitting said packets to said packet-switched communications channel;
said method performed within each apparatus further comprising the steps of:
receiving said packets from said packet-switched communications channel,
extracting said common channel signaling data from said packets,
reverse-transforming said data, and
transmitting said common channel signaling data via the respective port
wherein the first and second apparatus are further connected by an on-demand communications channel;
said method further comprising the steps of testing the packet-switched communications channel,
responding to a failed test of the packet-switched communications channel by establishing the on-demand communications channel;

receiving common channel signaling data via the respective port of the first and second apparatus and transmitting said encapsulated packets to said on-demand communications channel;
receiving said packets from said on-demand communications channel and extracting said common channel signaling data from said packets, and
transmitting said common channel signaling data via the respective ports of said first and second apparatus.

10. A data communications system comprising first and second apparatus, each of said first and second apparatus having a respective port disposed for sending and receiving common channel signaling data for telephone call processing, the first and second apparatus connected by a packet-switched communications channel, said channel of a type routing messages over an arbitrary path comprising hops including a final hop, said channel of a type in which the final hop of a path is not fully known in advance;

each of said first and second apparatus further comprising:
means for receiving common channel signaling data via its respective port, encapsulating said common channel signaling data in packets, and transmitting said packets to said packet-switched communications channel;

each of said first and second apparatus further comprising:
means for receiving said packets from said packet-switched communications channel, extracting said common channel signaling data from said packets, and transmitting said common channel signaling data via its respective port;

the system having associated with it a first point code or point codes, the received common channel signaling data having associated with it a second point code, said system further comprising means for comparing the first point code or point codes with the second point code wherein the first and second apparatus are further connected by an on-demand communications channel;
each of said first and second apparatus further comprising means for testing the packet-switched communications channel, and responding to a failed test of the packet-switched communications channel by establishing the on-demand communications channel;

the means for receiving common channel signaling data via the respective port of the first and second apparatus responsive to the failed test by transmitting said encapsulated packets to said on-demand communications channel;

the means for receiving said packets from said on-demand communications channel responsive to the failed test by extracting said common channel signaling data from said packets, and transmitting said common channel signaling data via the respective ports of said first and second apparatus.

11. The system of claim 10 wherein a failed test of the packet-switched communications channel comprises excessive latency in the packet-switched communications channel.

12. The system of claim 10 wherein the on-demand communications channel is ISDN.

13. A data communications system comprising first and second apparatus, each of said first and second apparatus having a respective port disposed for sending and receiving common channel signaling data for telephone call processing, the first and second apparatus connected by a packet-switched communications channel, said channel of a type routing messages over an arbitrary path comprising hops including a final hop, said channel of a type in which the final hop of a path is not fully known in advance;

each of said first and second apparatus further comprising:

means for receiving common channel signaling data via its respective port, encapsulating said common channel signaling data in packets, and transmitting said packets to said packet-switched communications channel;

each of said first and second apparatus further comprising:

means for receiving said packets from said packet-switched communications channel, extracting said common channel signaling data from said packets, and transmitting said common channel signaling data via its respective port;

the system having associated with it a first point code or point codes, the received common channel signaling data having associated with it a second point code, said system further comprising means comparing the first point code or point codes with the second point code wherein the packet-switched communications channel is a TCP/IP internet.

14. A method for use with a data communications system comprising first and second apparatus, each of said first and second apparatus having a respective port disposed for sending and receiving common channel signaling data for telephone call processing, the first and second apparatus connected by a packet-switched communications channel, said channel of a type routing messages over an arbitrary path comprising hops including a final hop, said channel of a type in which the final hop of a path is not fully known in advance; the system having associated with it a first point code or point codes; the method performed within each apparatus comprising the steps of:

receiving common channel signaling data via the respective port, determining a second point code associated with the received common channel signaling data;

comparing the second point code with the first point code or point codes;

encapsulating said common channel signaling data in packets, and transmitting said packets to said packet-switched communications channel;

said method performed within each apparatus further comprising the steps of:

receiving said packets from said packet-switched communications channel, extracting said common channel signaling data from said packets, and transmitting said common channel signaling data via the respective port wherein the first and second apparatus are further connected by an on-demand communications channel; said method further comprising the steps of testing the packet-switched communications channel, responding to a failed test of the packet-switched communications channel by establishing the on-demand communications channel;

receiving common channel signaling data via the respective port of the first and second apparatus and transmitting said encapsulated packets to said on-demand communications channel;

receiving said packets from said on-demand communications channel and extracting said common channel signaling data from said packets, and transmitting said common channel signaling data via the respective ports of said first and second apparatus.

* * * * *